(12) United States Patent
Yamaoka et al.

(10) Patent No.: US 10,111,383 B2
(45) Date of Patent: Oct. 30, 2018

(54) HAND PUSHED LAWN MOWER (71) Applicant: CHERVON (HK) LIMITED, Wanchai (HK)

(72) Inventors: Toshinari Yamaoka, Nanjing (CN); Fangjie Nie, Nanjing (CN); Haishen Xu, Nanjing (CN)

(73) Assignee: Chervon (HK) Limited, Wanchai (HK)

(*) Notice: Subject to any disclaimer, the term of this patent is extended or adjusted under 35 U.S.C. 154(b) by 0 days.

(21) Appl. No.: 15/153,066

(22) Filed: May 12, 2016

(65) Prior Publication Data

US 2016/0338266 A1   Nov. 24, 2016

(30) Foreign Application Priority Data

May 20, 2015   (CN) .......................... 2015 1 0260935

(51) Int. Cl.
| | | |
|---|---|---|
| *A01D 34/00* | (2006.01) |
| *A01D 34/82* | (2006.01) |
| *A01D 34/78* | (2006.01) |
| *A01D 34/68* | (2006.01) |
| *A01D 34/81* | (2006.01) |

(Continued)

(52) U.S. Cl.
CPC ......... *A01D 34/82* (2013.01); *A01D 34/6806* (2013.01); *A01D 34/78* (2013.01); *A01D 34/81* (2013.01); *A01D 34/69* (2013.01); *A01D 2101/00* (2013.01)

(58) Field of Classification Search
CPC ........ A01D 42/00; A01D 34/64; A01D 34/73; A01D 34/76; A01D 34/78; A01D 34/81; A01D 2101/00; A01D 34/6806; A01D 34/68; A01D 34/82; A01D 34/69
See application file for complete search history.

(56) References Cited

U.S. PATENT DOCUMENTS 2,762,184 A * 9/1956 Farrer .................. A01D 43/077
                                                        56/13.4
2,791,078 A * 5/1957 Kiekhaefer ............ A01D 34/82
                                                        123/41.65

(Continued)

FOREIGN PATENT DOCUMENTS

EP         2656719 B1    11/2014

OTHER PUBLICATIONS

Canadian Patent Office, Office Action issued on Canadian patent application No. 2,930,258, dated Feb. 15, 2017, 4 pages.

*Primary Examiner* — Robert E Pezzuto
*Assistant Examiner* — Joan D Misa
(74) *Attorney, Agent, or Firm* — Greenberg Traurig, LLP (57) ABSTRACT

A hand pushed lawn mower includes a power unit including a motor and a circuit board, a support device for supporting the power unit, and a fan that rotates about a rotating axis. The power unit is detachably connected with the support device and includes a power unit housing. The power unit housing includes a containing chamber for containing the motor and the circuit board, an air inlet allowing an air flow to flow into the containing chamber, and an air outlet allowing the air flow to flow out of the containing chamber. When the fan is rotated, the air flow which flows into the containing chamber from the air inlet at least passes in contact with the circuit board and then flows out of the containing chamber through the air outlet.

10 Claims, 13 Drawing Sheets

(51) Int. Cl.
*A01D 34/69* (2006.01)
*A01D 101/00* (2006.01)

(56) References Cited

U.S. PATENT DOCUMENTS

| | | | | |
|---|---|---|---|---|
| 3,044,239 A * | 7/1962 | Harkness | A01D 34/6806 | 123/185.14 |
| 3,077,320 A * | 2/1963 | Broziat | A01D 34/822 | 191/12.4 |
| 3,091,906 A * | 6/1963 | Hall | A01D 34/003 | 56/1 |
| 3,221,481 A * | 12/1965 | Mattson | A01D 34/84 | 56/16.9 |
| 3,230,695 A * | 1/1966 | West | A01D 34/6806 | 318/762 |
| 3,452,523 A * | 7/1969 | Svensson | A01D 34/6806 | 56/12.8 |
| 3,468,108 A * | 9/1969 | Mattson | A01D 43/063 | 56/13.4 |
| 3,500,620 A * | 3/1970 | Duran | A01D 34/63 | 174/138 R |
| 3,593,505 A | 7/1971 | Mittelstadt | | |
| 3,641,749 A * | 2/1972 | Dwyer, Jr. | A01D 34/6806 | 56/17.5 |
| 4,232,505 A * | 11/1980 | Walto | A01D 34/416 | 56/12.7 |
| 4,245,455 A * | 1/1981 | Martin | A01D 34/695 | 56/12.8 |
| 4,276,737 A * | 7/1981 | Henning | A01D 34/695 | 56/12.8 |
| 4,527,380 A * | 7/1985 | Fushiya | A01D 34/695 | 411/535 |
| 4,711,077 A * | 12/1987 | Kutsukake | A01D 34/81 | 56/17.5 |
| 4,882,896 A | 11/1989 | Wilcox | | |
| 4,944,142 A * | 7/1990 | Sueshige | A01D 34/82 | 56/13.4 |
| 5,085,043 A * | 2/1992 | Hess | A01D 34/828 | 320/107 |
| 5,402,626 A * | 4/1995 | Zinck | A01D 34/78 | 56/11.9 |
| 5,606,851 A * | 3/1997 | Bruener | A01D 34/6806 | 56/10.8 |
| 5,819,513 A * | 10/1998 | Braun | A01D 34/6806 | 56/11.9 |
| 5,910,091 A * | 6/1999 | Lida; Tetsuo | A01D 34/78 | 56/16.7 |
| 5,953,890 A * | 9/1999 | Shimada | A01D 34/78 | 56/10.2 R |
| 6,658,829 B2 * | 12/2003 | Kobayashi | A01D 34/6806 | 56/10.5 |
| 6,666,008 B2 * | 12/2003 | Lida; Tetsuo | A01D 34/78 | 56/11.9 |
| 6,826,895 B2 * | 12/2004 | Iida | A01D 34/78 | 56/11.9 |
| 7,540,132 B2 * | 6/2009 | Shimada | A01D 34/828 | 56/11.9 |
| 8,191,343 B1 * | 6/2012 | Hauser | A01D 69/02 | 56/11.9 |
| 8,215,090 B2 * | 7/2012 | Ishikawa | A01D 34/82 | 248/637 |
| 8,429,885 B2 * | 4/2013 | Rosa | A01D 34/69 | 56/11.9 |
| 8,615,976 B1 * | 12/2013 | Hauser | H02K 7/1025 | 310/89 |
| 8,653,786 B2 * | 2/2014 | Baetica | A01D 34/78 | 320/104 |
| 8,963,497 B2 * | 2/2015 | Yang | A01D 69/02 | 320/113 |
| 2003/0037525 A1 | 2/2003 | Iida et al. | | |
| 2014/0165524 A1 * | 6/2014 | Schygge | B60L 8/003 | 56/10.7 |
| 2015/0359170 A1 * | 12/2015 | Ito | A01D 34/78 | 56/16.9 |

\* cited by examiner

HAND PUSHED LAWN MOWER

RELATED APPLICATION INFORMATION

This application claims the benefit under 35 U.S.C. § 119(a) of Chinese Patent Application No. CN 201510260935.8, filed on May 20, 2015, the disclosure of which is incorporated herein by reference in its entirety.

FIELD OF THE DISCLOSURE

The present disclosure relates generally to gardening tools and, more particularly, to a hand pushed lawn mower.

BACKGROUND OF THE DISCLOSURE

At present, lawn mowers are generally of the engine driven type. With attention to environmental protection, the engine driven type lawn mowers are gradually being replaced by electrical lawn mowers. The electrical lawn mower includes a motor and a control board. During operation of the electrical lawn mower, the motor and the control board may generate lots of heat. With the accumulation of heat, the temperature of the motor and control board is increased which may cause damage to the motor and control board.

The statements in this section merely provide background information related to the present disclosure and may not constitute prior art.

SUMMARY

In one aspect of the disclosure, a hand pushed lawn mower includes a power unit including a motor and a circuit board, a support device for supporting the power unit, and a fan that rotates about a rotating axis. The power unit is detachably connected with the support device and includes a power unit housing. The power unit housing includes a containing chamber for containing the motor and the circuit board, an air inlet allowing an air flow to flow into the containing chamber, and an air outlet allowing the air flow to flow out of the containing chamber. When the fan is rotated, the air flow which flows into the containing chamber from the air inlet at least contacts with the circuit board and then flows out of the containing chamber through the air outlet.

In another aspect of the disclosure, a hand pushed lawn mower includes a power unit including a motor and a circuit board, a support device for supporting the power unit, and a fan that rotates about a rotating axis. The power unit further includes a power unit housing. The power unit housing includes a containing chamber for containing the motor and the circuit board, an air inlet allowing an air flow to flow into the containing chamber, and an air outlet allowing the air flow to flow out of the containing chamber. The motor is positioned between the air inlet and the air outlet, and the air flow which passes through the air inlet and the air outlet flows contacts with the motor.

Further areas of applicability will become apparent from the description provided herein. It should be understood that the description and specific examples are intended for purposes of illustration only and are not intended to limit the scope of the present disclosure.

The drawings described herein are for illustrative purposes only of selected embodiments and not all possible implementations, and are not intended to limit the scope of the invention hereinafter claimed. Corresponding reference numerals indicate corresponding parts throughout the several views of the drawings.

DETAILED DESCRIPTION

The following description of the preferred embodiments is merely exemplary in nature and is in no way intended to limit the invention hereinafter claimed, its application, or uses.

Figure 1:
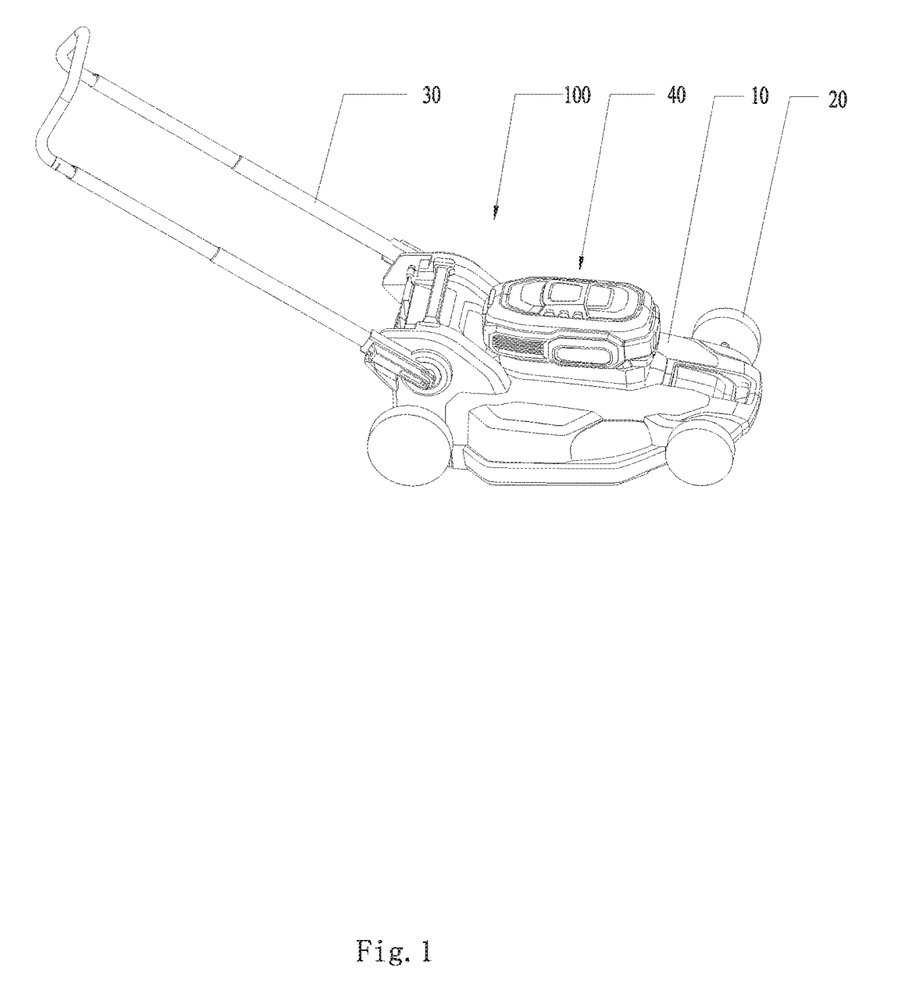
FIG. 1 is a schematic view of an exemplary lawn mower.
Figure 2:
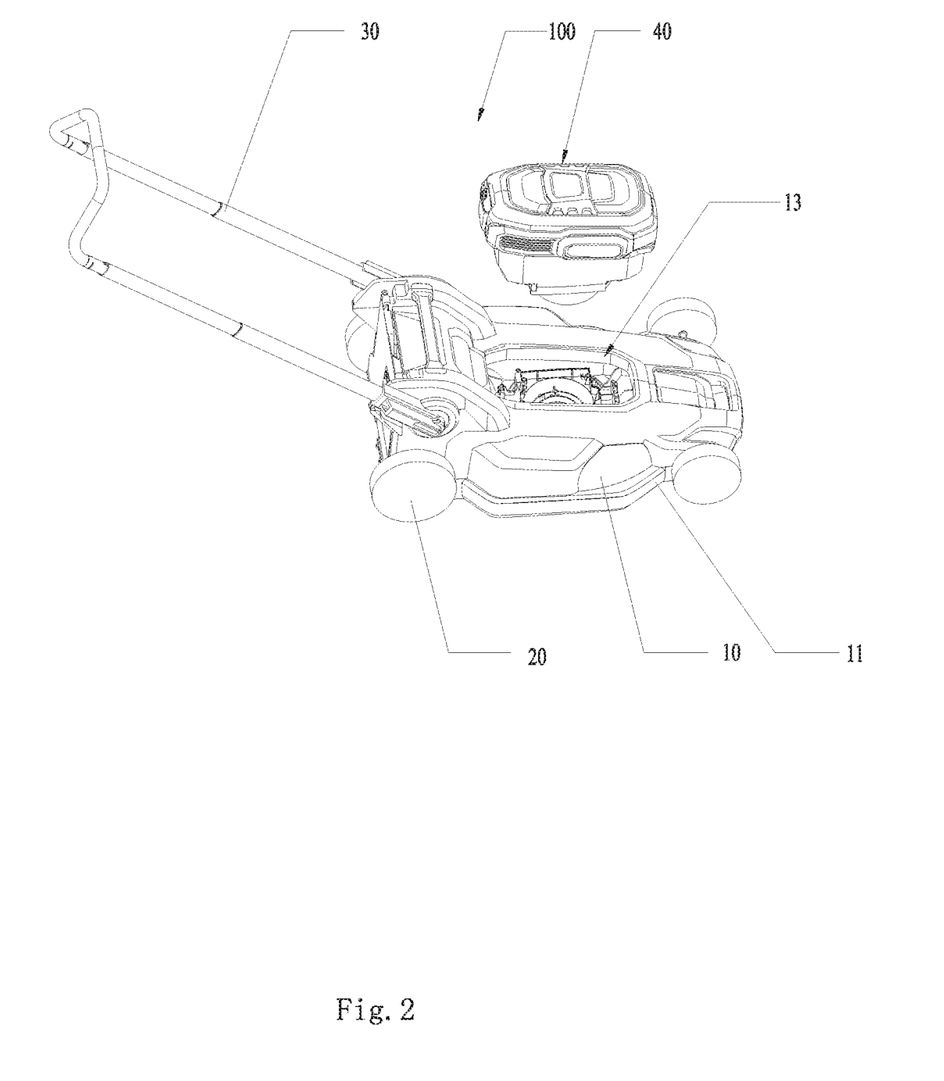
FIG. 2 is a schematic view of the connection of a power unit and a support device of the lawn mower in FIG. 1.
Figure 3:
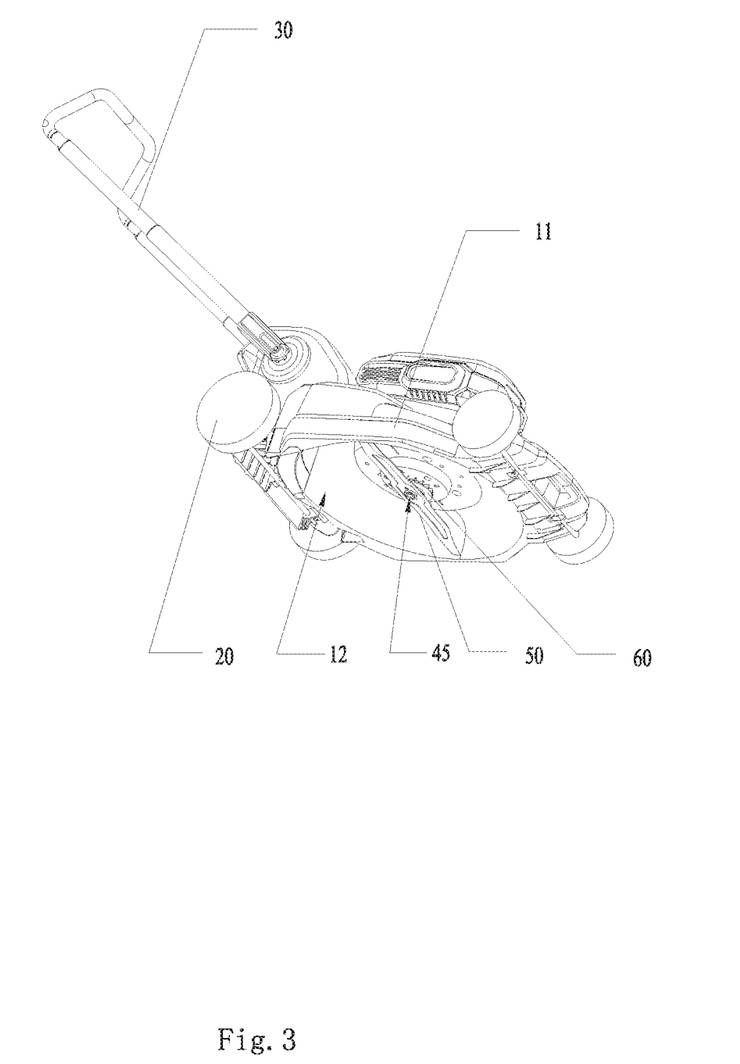
FIG. 3 is a schematic view of the inner structure of a cutting chamber of the lawn mower in FIG. 1.
Figure 4:
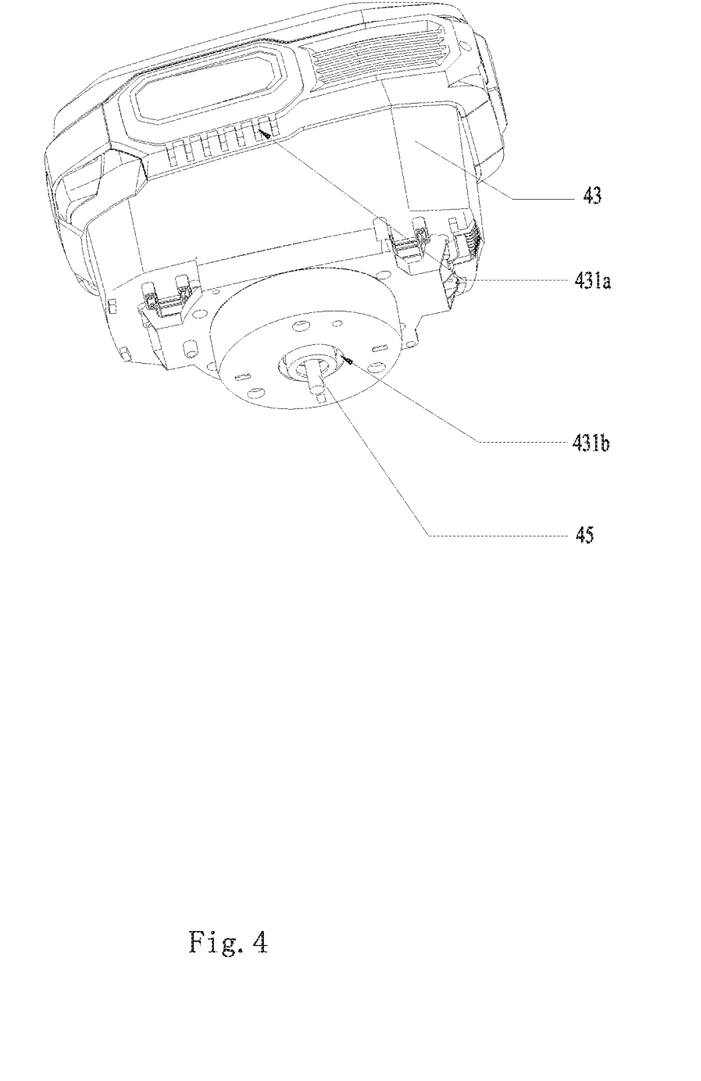
FIG. 4 is a schematic view of the power unit of the lawn mower in FIG. 1.

Referring to FIGS. 1-3, a hand pushed lawn mower 100 includes a support device 10, a wheel assembly 20, a handle assembly 30, a power unit 40, a cutting element 50, a fan 60 and battery packs 70.

Figure 5:
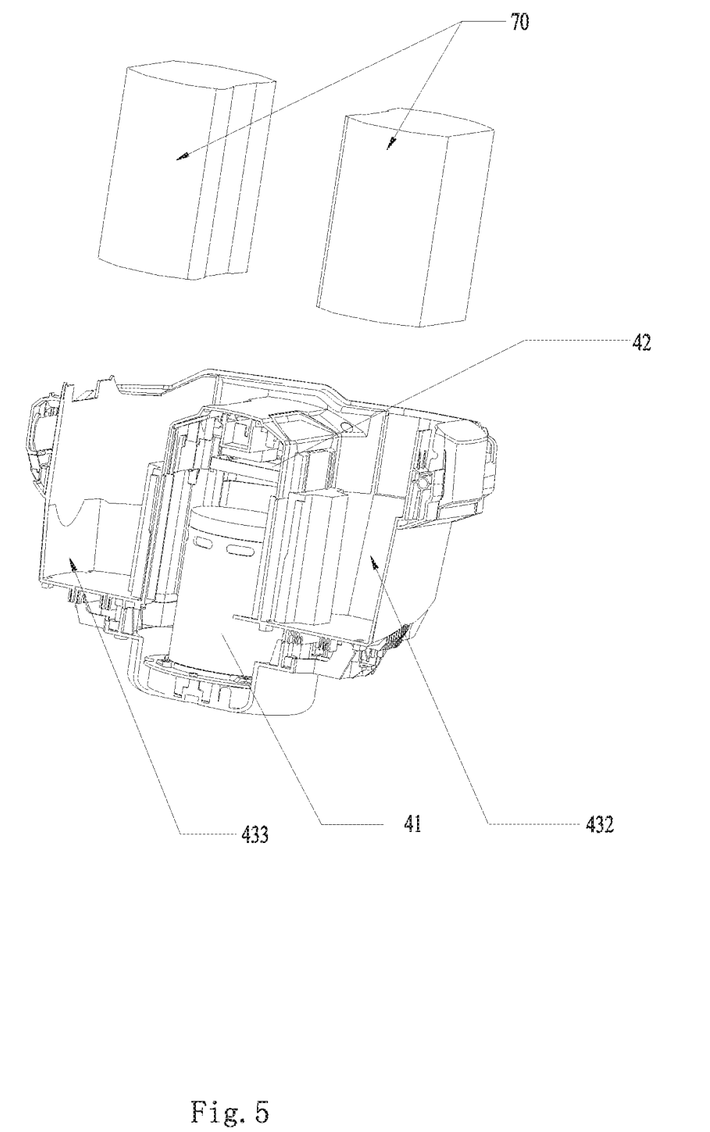
FIG. 5 is a schematic view of the mounting of battery packs of the power unit in FIG. 4.
Figure 6:
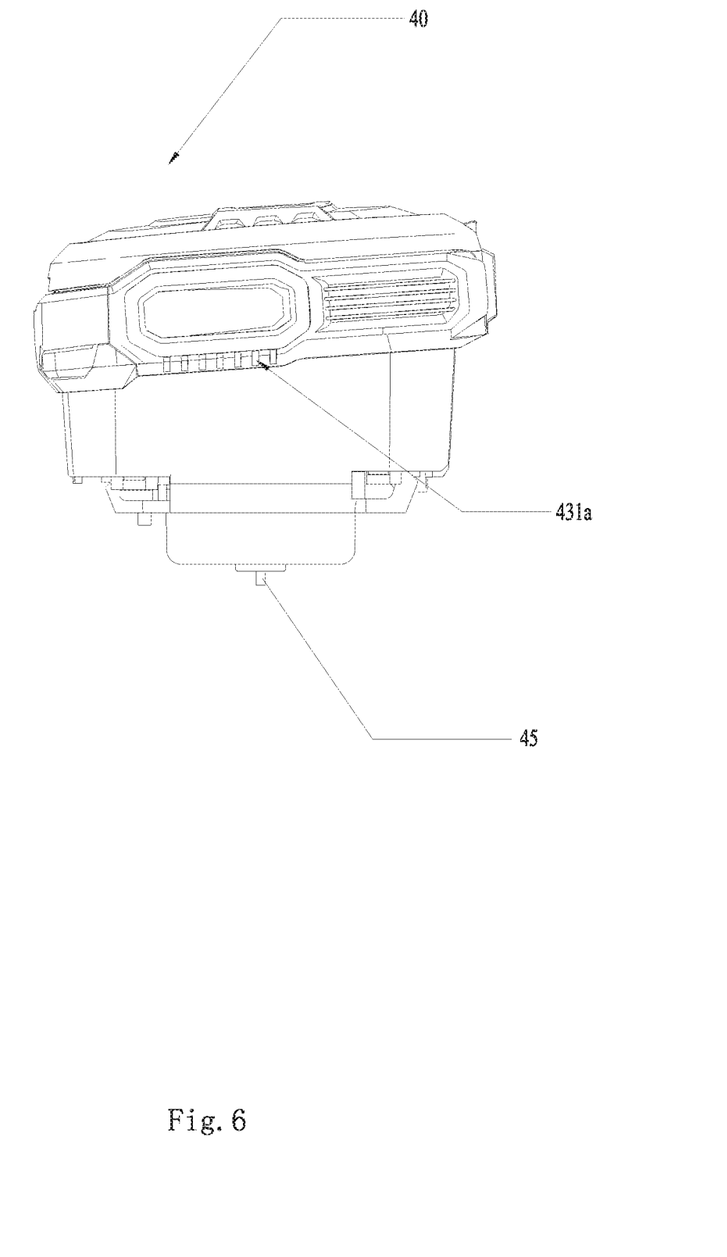
FIG. 6 is a front view of the power unit in FIG. 4.
Figure 7:
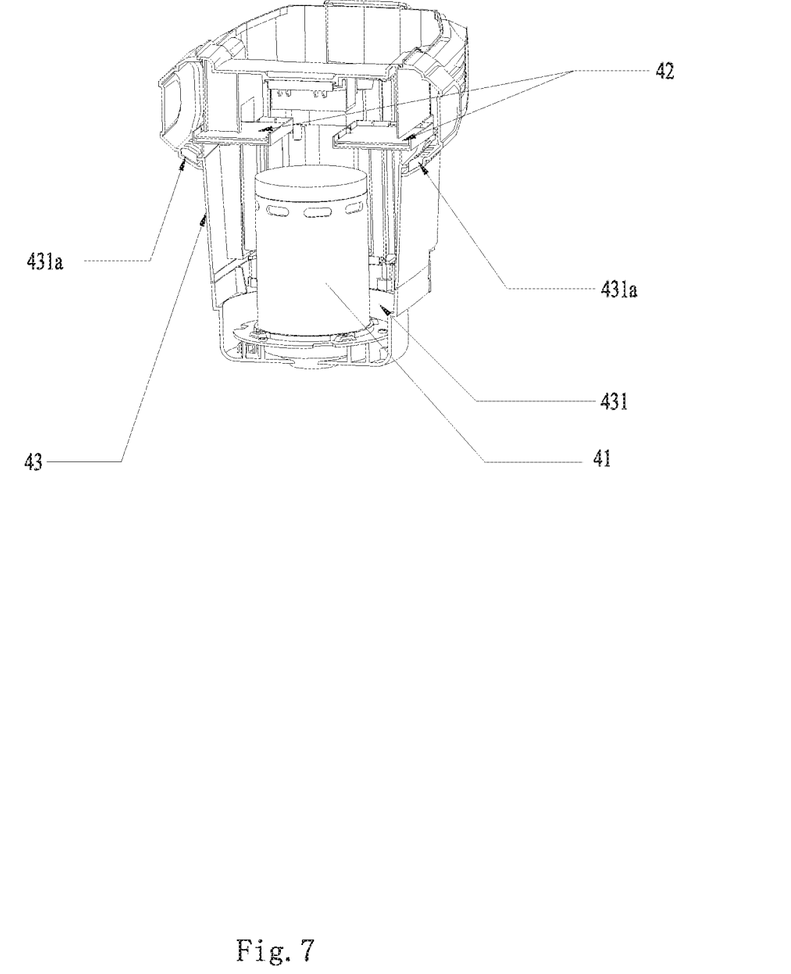
FIG. 7 is a sectional view of the power unit in FIG. 4.

The support device 10 is constructed to provide a main portion of the hand pushed lawn mower 100, which is used for supporting a first device which functions as an energy source for the hand pushed lawn mower 100 and a second device which transforms the energy from the energy source to mechanical energy. As shown in FIG. 5, the hand pushed lawn mower 100 uses the battery packs 70 and a motor 41 acting as the energy source and a prime mover, respectively.

The wheel assembly 20 is rotatably mounted on the support device 10, so that the hand pushed lawn mower 100 can move on the ground.

The handle assembly 30 is used by a user to push the hand pushed lawn mower 100, and the user can control the hand pushed lawn mower 100 through the handle assembly 30. Alternatively, the support device 10 can be integrated with a self-propelled system, and the user can control the self-propelled system through the handle assembly 30.

The power unit 40 is adapted to integrate the energy source and the prime mover as a whole.

Normally, the power unit and the support device are designed as a non-detachable whole which acts as a main portion of the lawn mower. The power unit is formed with a battery chamber for containing the battery pack. The endurance of the lawn mower can be improved because of the detachable battery pack.

In order to facilitate maintenance and a changing of the power unit so that different power units can fit the same support device, the power unit and the support device are designed as two independent and separable devices, which have respective different housing.

The support device 10 includes a support housing 11. The support housing 11 includes two portions: a first portion and a second portion. The first portion is located on the top of the support housing 11, which forms a part of the shape of the hand pushed lawn mower 100. The first portion is provided with an engaging portion 13 which is capable of engaging with the power unit 40. The second portion is located on the bottom of the support housing 11, which is formed with a cutting chamber 12 opened downwardly and a channel. The cutting chamber 12 is used for containing the cutting element 50 and the fan 60. The channel allows the grass cut by the cutting element 50 to be collected through the channel.

The power unit 40 includes an output shaft 45. The output shaft 45 can be a motor shaft or a transmission shaft driven by the motor shaft. When the power unit 40 is mounted to the support device 10, the output shaft 45 extends into the cutting chamber 12.

The cutting element 50 and the fan 60 are mounted to the output shaft 45 through fasteners. It is noted that, the fan 60 can be rotated about the same axis as the output shaft 45 or about a different axis from the output shaft 45. For saving space, both the cutting element 50 and the fan 60 are driven by the output shaft 45, and the fan 60 is rotated about a rotating axis C.

Referring to FIGS. 4-13, the power unit 40 includes the motor 41, a circuit board 42 and a power unit housing 43. The motor 41 is used for driving the cutting element 50 to rotate. The circuit board 42 is used for controlling the motor 41. The power unit housing 43 is formed with a containing chamber 431, in which the motor 41 and the circuit board 42 are contained. The power unit housing 43 is further formed with battery chambers 432, 433. The two battery packs 70 are removably arranged within the battery chambers 432, 433 and electrically connected with the motor 41 and the circuit board 42.

In order to realize a self-propelled function, besides the motor 41, the hand pushed lawn mower 100 can include an auxiliary motor. The fan 60 can be driven by the motor 41 or the other motor.

The battery pack of the lawn mower usually includes two styles: a built-in battery pack and a removable battery pack. For the built-in battery pack, it cannot be removed from the power unit housing. During operation, if the power runs out, it is necessary to stop the operation of the lawn mower and return the lawn mower to a charging place. The lawn mower is then connected to a charger. After finishing the charging operation, the cutting operation can be continued. For the removable battery pack, when the power runs out, the user can remove and exchange the battery pack so that the cutting operation can be continued.

In this embodiment, the battery packs 70 of the hand pushed lawn mower 100 can be removed from the power unit 40 and exchanged.

Figure 12:
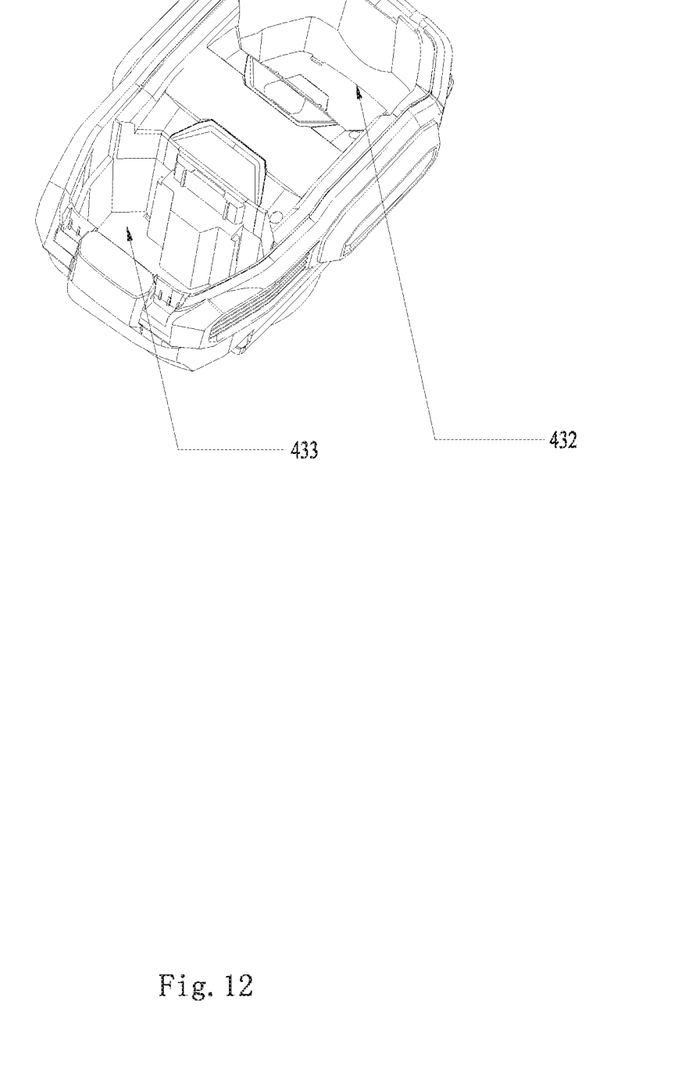
FIG. 12 is a schematic view of the power unit in FIG. 4, wherein a cover is removed.
Figure 13:
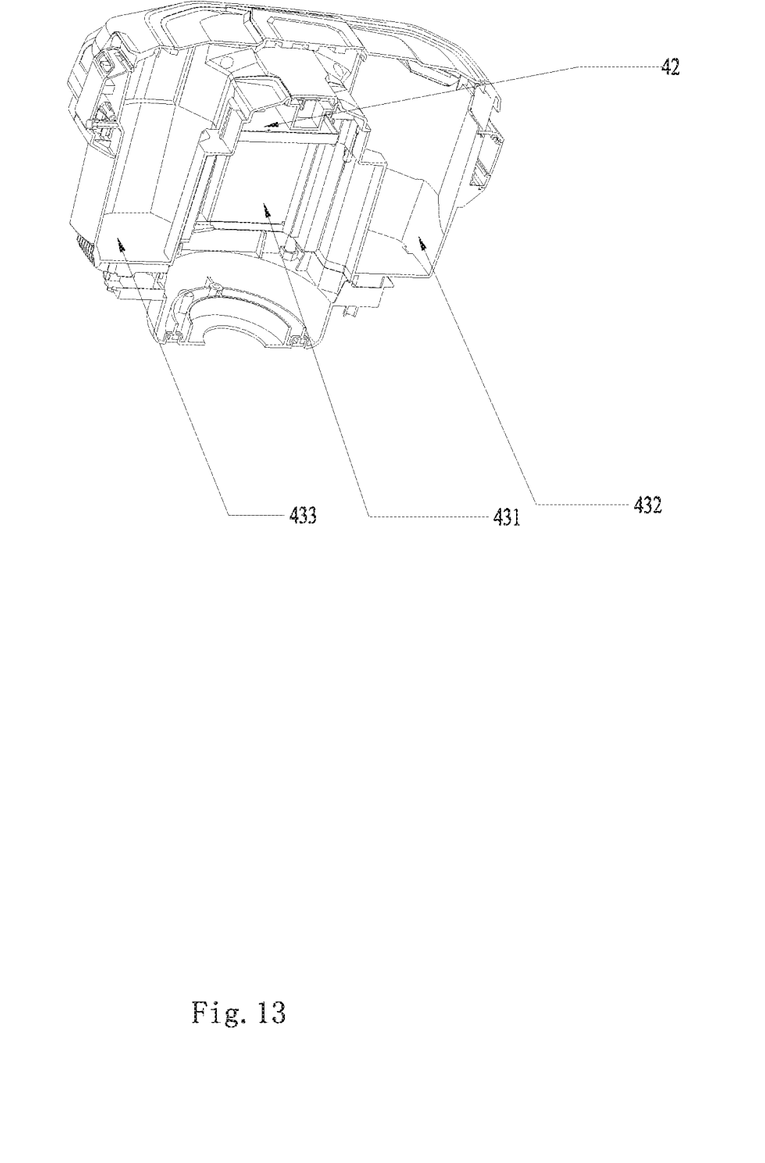
FIG. 13 is a sectional view of the power unit in FIG. 4, wherein the motor is removed.

A cover 44 is positioned above the battery chambers 432, 433, which is able to isolate the battery packs 70 from the outside and protect the battery packs 70.

Figure 8:
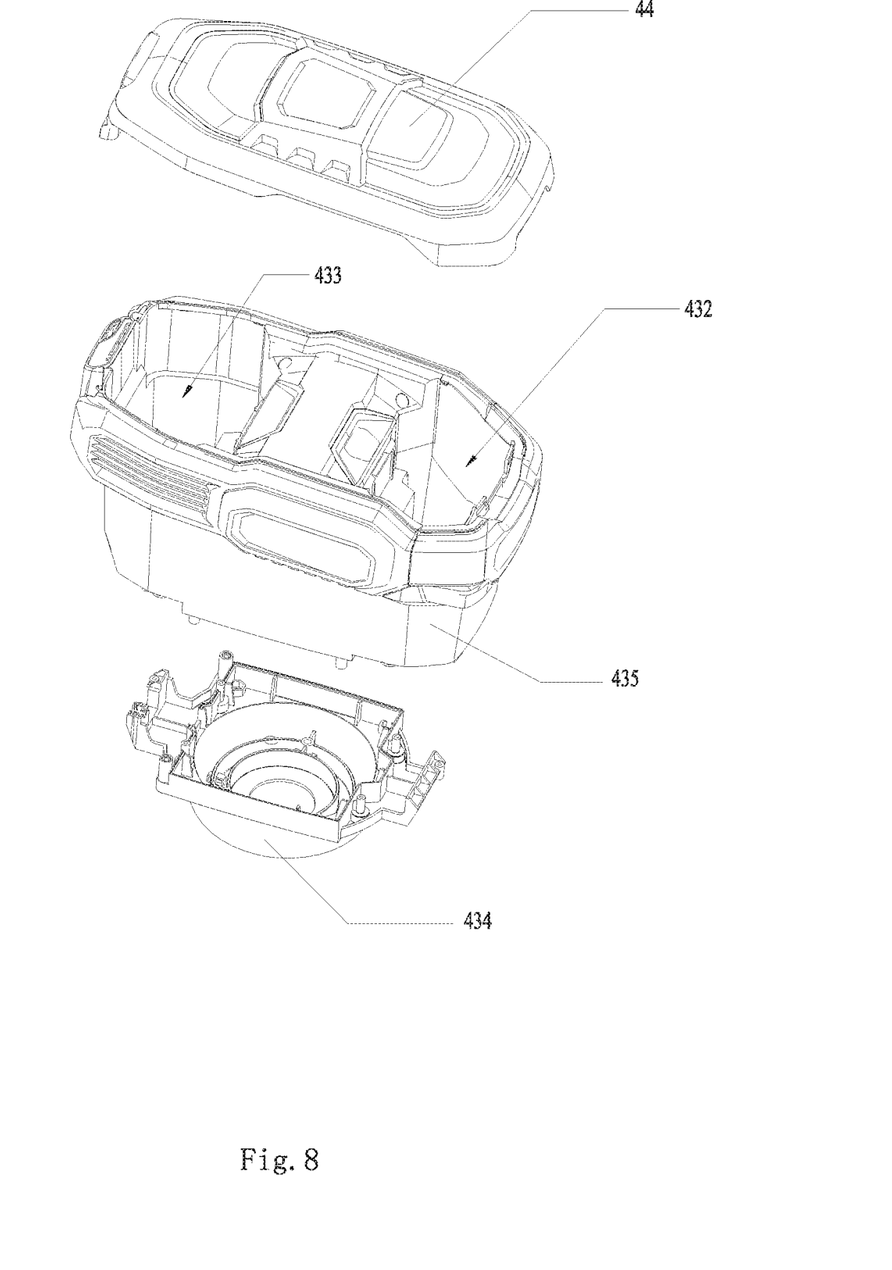
FIG. 8 is an exploded view of the power unit in FIG. 4.

The motor 41 and the circuit board 42 are important portions of the power unit 40. As shown in FIG. 8, in order to assemble the motor 41 and the circuit board 42 in the containing chamber 431, the containing chamber 431 is constructed by several detachable housing portions. Specifically, the power unit housing 43 includes a housing base 434 and a housing main body 435. The housing main body 435 forms a substantial portion of the containing chamber 431. The housing base 434 is assembled to the housing main body 435 so as to encase the motor 41 and the circuit board 42 in the containing chamber 431.

In order to carry out the cutting operation effectively, the motor 41 of the hand pushed lawn mower 100 needs to output high power, so the circuit board 42 has high voltage and current. Because the motor 41 and the circuit board 42 are encased in the containing chamber 431, they may generate a lot of heat and the accumulated heat may cause damage to the power unit 40 if there is no treatment to disperse the heat.

In order to disperse the heat, the power unit housing 43 is provided with an air inlet 431a and an air outlet 431b. The air inlet 431a allows an air flow to flow into the containing chamber 431, and the air outlet 431b allows the air flow to flow out of the containing chamber 431. However, flowing into and flowing out are relative, the air flowing direction mainly depends on the guidance of the fan 60 and the positions of the air inlet 43 1a and the air outlet 43 1b.

When the fan 60 is rotated, the air flow which flows into the containing chamber 431 from the air inlet 431a at least passes in contact with the circuit board 42, and then flows out of the containing chamber 431 from the air outlet 431b.

In one embodiment, the motor 41 and the circuit board 42 are so arranged that the air flow which flows into the containing chamber 431 from the air inlet 431a firstly passes in contact with the circuit board 42, and then passes in contact with the motor 41. The reason why the motor 41 and the circuit board 42 are so arranged is that the fan 60 is driven by the motor 41 to rotate and generates negative pressure so as to generate the air flow, thus the above said arrangement provides a compact and reasonable structure of the power unit 40. Further, because the motor 41 is close to the air source, the cooling effect of the motor 41 can be ensured. So, even the air flow which passes in contact with the circuit board 42 absorbs some heat, the motor 41 also can be cooled. For the circuit board 42, the air flow which passes in contact with the circuit board 42 has a relatively low temperature and a slow flowing speed, so that the air flow can absorb the heat sufficiently.

For the motor cooling, the motor 41 can be cooled when the air flow passes in contact with the outside of the motor 41. But if the air flow passes in contact with the inside of the motor 41, the cooling effect is better.

Whatever the fan 60 is an axial type or a centrifugal type, it can generate negative pressure and guide the air flow to flow toward the fan 60 along the rotating axis C.

In another embodiment, the air inlet 431a and the air outlet 431b are communicated at least in a direction parallel to the rotating axis C, so the air flow can pass through the air inlet 431a and the air outlet 431b at least along the direction parallel to the rotating axis C. For the air outlet 431b, the air flow can enter into the negative pressure area generated by the fan 60 along a relative short air path. For the air inlet 431a, the air quantity along the direction can be ensured. Further, due to the air inlet 431a and the air outlet 431b arranged along the rotating axis C, the fan 60 can directly acted on the air inlet 431a and the air outlet 431b, and the efficiency of the fan 60 is improved. So the fan 60 with small power can satisfy the cooling requirements, and the endurance time of the hand pushed lawn mower 100 is elongated.

In another embodiment, the motor 41 is positioned between the air inlet 431a and the air outlet 431b, and the air flow which passes through the air inlet 431a and the air outlet 431b flows through the inside of the motor 41. With this arrangement, the air flow passes through the air inlet 431a and the motor 41 from up to down, and then exhausts from the air outlet 431b. The air path is simple and the structure of the power unit 40 is compact. A motor housing 411 is provided with through holes 411a, 411b on its two sides respective close to the air inlet 431a and the air outlet 431b. The through holes 411a, 411b allow the air flow to pass through the inside of the motor 41. Thus, the contacting area of the motor 41 and the cooling air flow is increased, and the cooling effect is improved.

The cutting chamber 12 is opened downwardly. The power unit housing 43 is at least partially positioned in the cutting chamber 12, so that the height of the power unit housing 43 is decreased and the center of gravity of the hand pushed lawn mower 100 is relatively low. Thus, the hand pushed lawn mower 100 can be pushed to move steadily, and the vibration is very small. Further, due to the decreased height of the power unit housing 43, the height of the hand pushed lawn mower 100 is decreased when it is stored and transported. The cost of transportation is decreased, and for the user only a small space is needed to store the folded, hand pushed, lawn mower 100. The air outlet 431b is communicated with the cutting chamber 12.

The fan 60 is positioned within the cutting chamber 12 so that the fan 60 provides the cooling effect. Further, the rotation of the fan 60 can push the grass to move to the channel so as to facilitate the collection of the grass.

In another embodiment, the fan 60 is positioned within the containing chamber 431 and very close to the motor 41 and the circuit board 42 so as to generate the air flow with high flowing speed nearby the motor 41 and the circuit board 42. During the operation, the air flow flows into the containing chamber 431 from the air inlet 431a and flows out of the containing chamber 431 from the air outlet 431b, and there is no other air flowing direction, so the loss of the air flow is decreased and the fan 60 is used effectively. Thus, the fan 60 with small power can satisfy the cooling requirements, which decrease the cost and improve the endurance time of the hand pushed lawn mower 100.

In another embodiment, the motor 41 includes a coil and the motor housing 411. The coil and the fan 60 are contained within the motor housing 411. Because of the difference of seeding condition and watering condition, the density of the grass may be different at different positions. When the hand pushed lawn mower 100 meets a relatively more dense area, it works under heavy load. The motor 41 generates lots of heat, which forms the main heat source, and heat dispersing is very important. So, for the motor 41, the fan 60 arranged within the motor housing 11 can provide better cooling effect than that arranged at other position.

The hand pushed lawn mower 100 can include several fans 60 which can be arranged in one or more of the cutting chamber 12, the containing chamber 431 and the motor housing 11. According to the heat distribution of the motor 41 and the circuit board 42, the several fans 60 are arranged reasonably so as to reasonably match the cooling air flow which passes in contact with the motor 41 and the circuit board 42. Thus, the cooling effect is improved and the energy loss is decreased. The centrifugal fan and the axial fan provide different air flowing directions. In order to make the air flow flows into the containing chamber 431 from the air inlet 431a and flows out of the containing chamber 431 from the air outlet 431b, and reduce the unnecessary air flowing direction, one or more of the centrifugal fan and the axial fan can be chosen based on the requirements.

Figure 9:
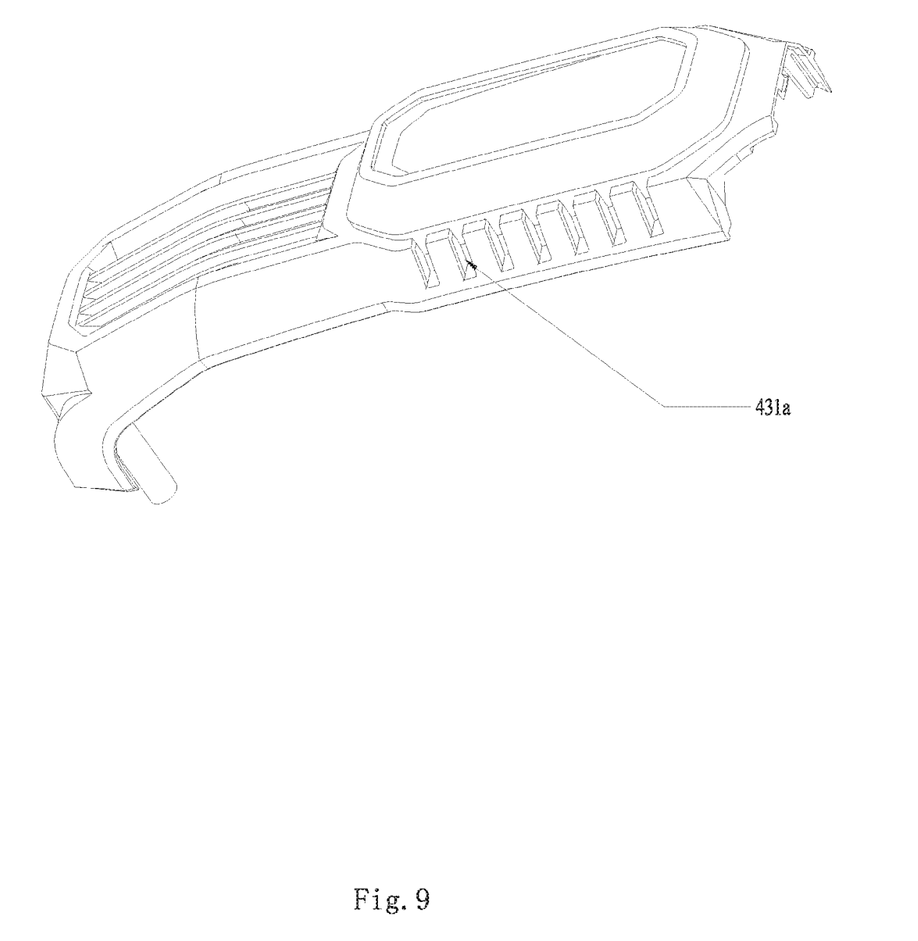
FIG. 9 is a schematic view of an air inlet of the power unit in FIG. 4.
Figure 10:
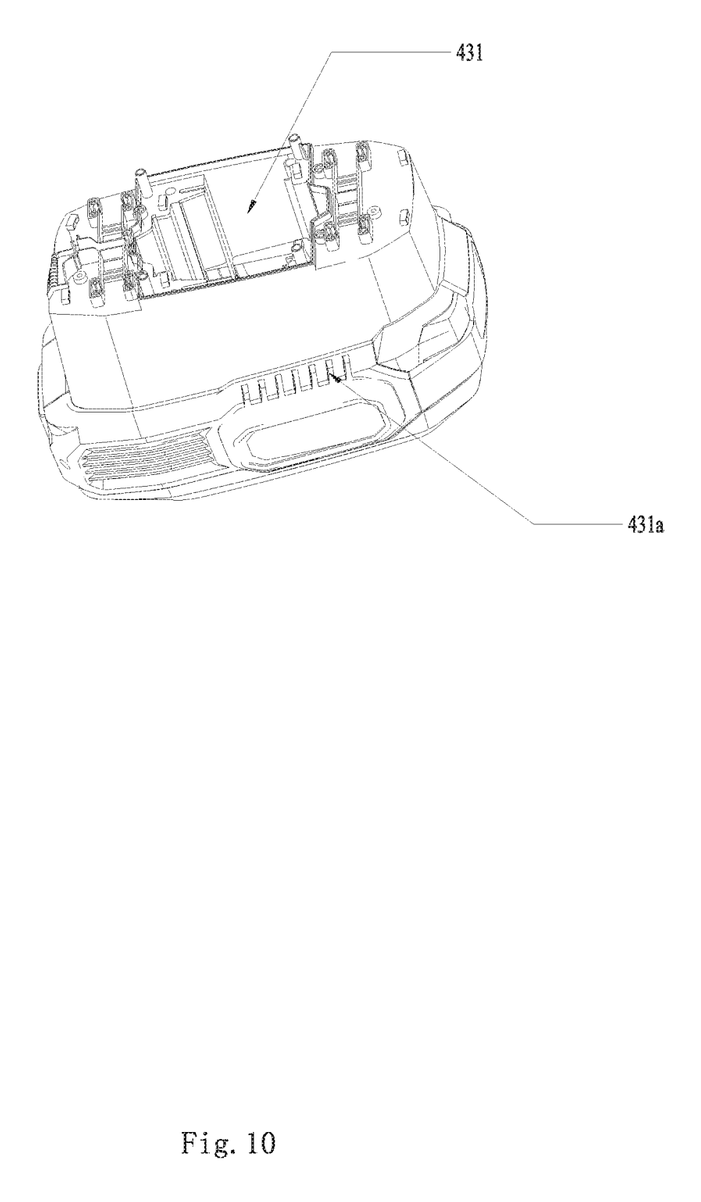
FIG. 10 is a schematic view of the power unit in FIG. 4, wherein a housing base and a motor are removed.

Two air inlets 431a are positioned on the left and right sides of the power unit housing 43, which are opened downwardly. Thus, when the hand pushed lawn mower 100 works in the rain, the rain water is prevented from entering into the power unit housing 43. It is noted that the front, back, left, right, up and down in the description are relative positions when the hand pushed lawn mower 100 works on a flat ground. Because the hand pushed lawn mower 100 may work on a slope, so the front, back, left, right, up and down in the description cannot be defined as absolute positions.

Normally, the lawn mower has higher power than a blower and a grass trimmer, so it needs a battery pack with large capacity to satisfy the working time. However, the battery pack with large capacity has a larger volume and a heavier weight, which is inconvenient to carry and does not apply to a hand held power tool such as the blower and grass trimmer. In order to expand the usage of the battery pack, reduce the amount of the battery pack, decrease the using cost and share the battery pack between multiple power tools, the hand pushed lawn mower 100 includes two battery packs 70. The two battery packs 70 have small volumes and can be shared with other power tools.

In order to reduce the air resistance during the movement of the hand pushed lawn mower 100, the hand pushed lawn mower 100 is relatively long in the front and back direction and short in the width direction. The hand pushed lawn mower 100 is narrow in the width direction, so it is inconvenient to arrange several battery packs in the width direction. The two battery packs 70 are mounted on the power unit 40 and symmetrically arranged along the front and back direction relative to the motor 41.

Normally, the circuit board has a smaller volume than the battery pack. In order to make a compact structure and decrease the cost, the circuit board is positioned on a side of the power unit. When there are several battery packs arranged in the power unit, several circuit boards are needed to control the several battery packs.

If the several circuit boards are stacked, the heat generated is difficult to disperse. So it is better to tile the several circuit boards. When the several circuit boards are positioned on the same side of the power unit, the heat generated is concentrated on the same side, which is difficult to disperse. So it is better to tile the several circuit boards on the left and right sides of the power unit. In order to improve the cooling effect, air inlets are provided on the left and right sides, and the circuit boards are positioned close to the air inlets. Specifically, the containing chamber 431 contains two circuit boards 42 positioned on the left and right sides of the power unit housing 43 and close to the air inlets 431a.

The air inlets 431a are approximately opened downwardly. The circuit boards 42 are positioned in a portion of the containing chamber 431 that above the air inlets 431a. So the containing chamber 431 is used reasonably and compactly. Further, the circuit boards 42 are close to the air inlets 431a so as to provide better cooling effect.

The battery chambers 432, 433 are respectively positioned on the front and back of the motor 41. The two battery packs 70 are removably mounted to the battery chambers 432, 433. The air inlets 431a positioned on the left and right sides of the power unit housing 43 allow the containing chamber 431 to communicate with the outside. The air inlets 431a are constructed by a plurality of labyrinth slots so as to prevent foreign matter from entering the power unit housing 43.

The air outlet 431b is positioned on a low portion of the power unit housing 43. The power unit housing 43 is partially positioned in the cutting chamber 12 so that the cutting chamber 12 and the containing chamber 431 are communicated.

The power unit housing 43 is mainly constructed by the housing base 434 and housing main body 435. The motor 41 can be removed and mounted when the housing base 434 and housing main body 435 are separated. The air outlet 431b is positioned on the housing base 434.

Figure 11:
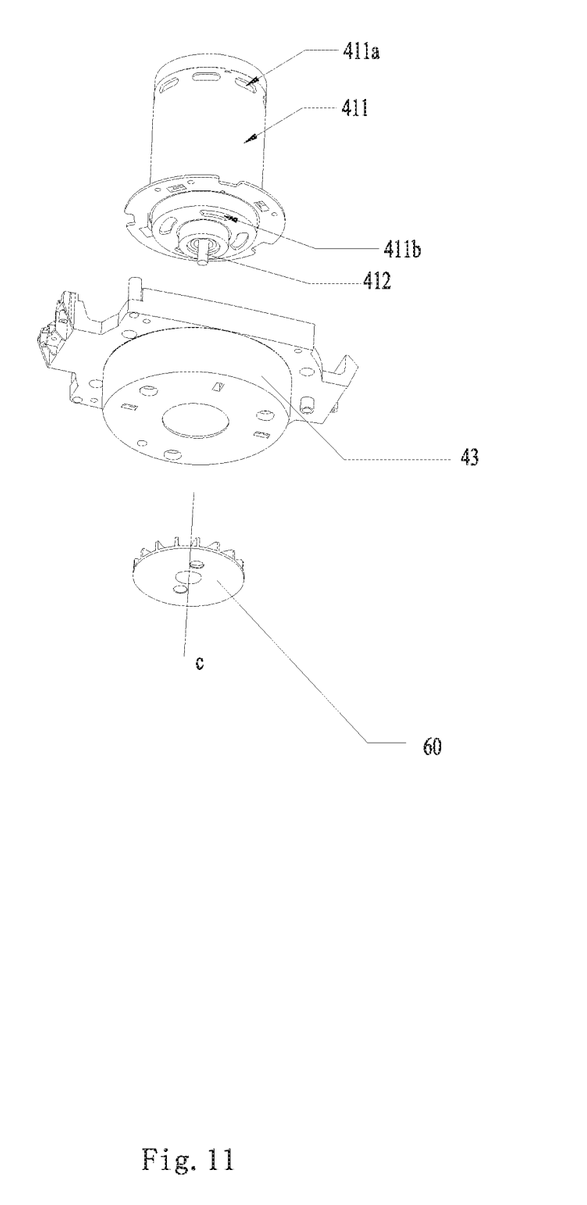
FIG. 11 is a schematic view of the connection of the motor, the housing base and a fan of the power unit in FIG. 4.

The motor 41 includes the motor housing 411 and a motor shaft 412. The motor housing 411 is connected with the power unit housing 43. The motor shaft 412 can be rotated relative to the power unit housing 43.

The containing chamber 431 is at least partially located above the air inlets 431a. The circuit boards 42 are positioned above the air inlets 431a and close to the air inlets 431a. Specifically, the two circuit boards 42 are respectively close to the air inlets 431a on the two sides.

The air inlets 431a and the air outlet 431b are communicated in the direction parallel to the rotating axis C.

The air inlets 431a are approximately opened downwardly, the shape of which is influenced by the outline of the power unit housing 43. The air flow passes through the air inlets 431a from an area which has 0-90 degrees relative to the rotating axis C. The area does not include a direction opened upwardly so rain water is prevented from entering the containing chamber 431 from the air inlets 431a and the motor 41 and the circuit boards 42 are prevented from damage by the rain water.

The air outlet 431b is approximately opened downwardly. When the fan 60 is rotated, the air flow passes through the air outlet 431b from up to down. The cooling effect is improved.

The motor shaft 412 is extended in the cutting chamber 12. The fan 60 is rotated about the rotating axis C. Normally the fan can be mounted to the motor shaft directly or through a belt transmission device. In this embodiment, the fan 60 is directly mounted to the motor shaft 412. This arrangement without a transmission device has simple structure and high stability, and facilitates the detaching and mounting of the power unit 40.

In another embodiment, the fan 60 is mounted on the output shaft 45 located outside of the power unit housing 43. The air outlet 431b is positioned in the negative pressure area of the fan 60. When the fan 60 is rotated, the air flow passes through the containing chamber 431 and exhausts from the air outlet 431b. With this arrangement, the space of the hand pushed lawn mower 100 is used reasonably so as to provide a compact structure, and the cooling effect is improved because the air flowing speed is relative high in the negative pressure area.

When the fan 60 or the cutting element 50 is rotated, the air flow flows into the containing chamber 431 from the air outlets 431a, passes over and through the circuit boards 42 and the through holes 411a, 411b of the motor 41, and then exhausts from the air outlet 431b.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A hand pushed lawn mower, comprising:
a main body including a receptacle;
a power box removably received within the receptacle of the main body, the power box including at least one battery pack and a power unit, the power unit comprising a motor and a circuit board; and
a fan that rotates about a rotating axis,
wherein the power unit is detachably connected with the main body and received within the receptacle, the power unit housing comprising:
a battery chamber for containing the at least one battery pack;
a containing chamber for containing the motor and the circuit board, the containing chamber at least partially defined by an inner wall, an outer wall, and a bottom wall, the inner wall of the containing chamber defining a wall of the battery chamber and facing the at least one battery pack;
the outer wall comprising an air inlet opened downwardly for allowing an air flow to flow into the containing chamber; and
the bottom wall comprising an air outlet for allowing the air flow to flow out of the containing chamber,
wherein the circuit board is disposed above the air inlet of the containing chamber to prevent water from entering into the containing chamber from the air inlet;
wherein, when the fan is rotated, the air flow which flows into the containing chamber from the air inlet at least passes over the circuit board and then flows out of the containing chamber through the air outlet.

2. The hand pushed lawn mower of claim 1, wherein the air flow which flows into the containing chamber from the air inlet at least passes through the motor and then flows out of the containing chamber through the air outlet.

3. The hand pushed lawn mower of claim 1, wherein the air flow which flows into the containing chamber from the air inlet and flows out of the containing chamber through the air outlet at least passes through the circuit board and the motor in turn.

4. The hand pushed lawn mower of claim 1, wherein the motor comprises a coil and a motor housing and wherein the coil and the fan are contained within the motor housing.

5. The hand pushed lawn mower of claim 1, further comprising a cutting element for cutting grass, wherein a supporting device is formed with a cutting chamber for containing the cutting element and the fan is contained within at least one of the cutting chamber or the containing chamber.

6. A hand pushed lawn mower, comprising:
a main body including a receptacle;
a power box removably received within the receptacle of the main body, the power box including at least one battery pack and a power unit, the power unit comprising a motor and a circuit board; and
a fan that rotates about a rotating axis,
wherein the power unit further comprises a power unit housing, the power unit housing comprising:
a battery chamber for containing the at least one battery pack;
a containing chamber for containing the motor and the circuit board, the containing chamber at least partially defined by an inner wall, an outer wall, and a bottom wall, the inner wall of the containing chamber defining a wall of the battery chamber and facing the at least one battery pack;
the outer wall comprising an air inlet opened downwardly for allowing an air flow to flow into the containing chamber; and
the bottom wall comprising an air outlet for allowing the air flow to flow out of the containing chamber, wherein the circuit board is disposed above the air inlet of the containing chamber to prevent water from entering into the containing chamber from the air inlet, and wherein the motor is disposed between the air inlet and the air outlet, and the air flow which passes through the air inlet and the air outlet flows through the motor.

7. A hand pushed lawn mower of claim 6, wherein the containing chamber is at least partially located above the air inlet.

8. A hand pushed lawn mower of claim 7, wherein the fan is located outside of the power unit housing, the motor comprises a motor housing for connecting with the power unit housing and a motor shaft that rotates relative to the motor housing, the motor housing is respectively formed with through holes on two sides of the motor housing respectively adjacent to the air inlet and the air outlet, and the motor shaft is connected with the fan.

9. A hand pushed lawn mower of claim 8, further comprising a cutting element for cutting grass and a support device for supporting the power unit, wherein the supporting device comprises a supporting housing, the supporting housing is formed with a cutting chamber for containing the cutting element, the cutting chamber is opened downwardly, the power unit housing is at least partially disposed in the cutting chamber, the air outlet is communicated with the cutting chamber, and the fan is disposed within the cutting chamber.

10. A hand pushed lawn mower of claim 7, wherein the fan is a centrifugal fan, and the air outlet is located in a negative pressure area of the centrifugal fan.

\* \* \* \* \*